Patented Feb. 24, 1942

2,273,983

UNITED STATES PATENT OFFICE 2,273,983

SYNTHETIC RUBBER COMPOSITION

Emil Ott, Elsmere, Del., assignor to Hercules Powder Company, Wilmington, Del., a corporation of Delaware No Drawing. Application June 7, 1940, Serial No. 339,323

8 Claims. (Cl. 260—28)

My invention relates to a synthetic rubber composition and more specifically to a synthetic rubber composition comprising a vulcanized mixture of a polymerized chloroprene and chlorinated paraffin.

Synthetic rubber compositions including a polymerized chloroprene, for example, that known commercially as Neoprene or Duprene, as a base show considerable advantage over similar compositions including natural rubber as a base, in that they possess higher resistance to solvents, particularly gasoline and mineral oils, and show less loss of desirable physical properties on exposure to solvents. For this reason, such synthetic rubber compositions have found wide application in the manufacture of printing rolls, gasoline hose, gaskets and other articles which come into contact with solvents. Such compositions are, however, not entirely resistant to swelling in solvents and further improvement is desirable.

I have invented a synthetic rubber composition which is highly resistant to the swelling action of gasoline and mineral oils, which comprises essentially a vulcanized mixture of polymerized chloroprene and a chlorinated paraffin wax. I have found that the presence of the chlorinated paraffin in the vulcanized compositions not only increases the resistance of the composition to swelling, but has the advantage of not adversely effecting the curing of the composition in the vulcanization process. The fact that the chlorinated paraffin has no detrimental effect on the curing of the compositions in accordance with this invention is rather surprising in view of the well-known fact that many other materials which may be added do have such an effect.

I have found that my vulcanized compositions have a much greater resistance to swelling by gasoline, petroleum naphthas, and mineral oils when the chlorinated paraffin is of the type soluble in gasoline than when a chlorinated paraffin insoluble in gasoline is utilized. This invention, therefore, consists of a vulcanized composition of polymerized chloroprene and a gasoline-soluble chlorinated paraffin.

The fact that a vulcanized composition made from a chlorinated paraffin soluble in gasoline and petroleum naphtha is insoluble and highly resistant to swelling and is more resistant than a similar vulcanized composition made from a gasoline-insoluble chlorinated paraffin is surprising. The phenomenon is attributed to a reaction between the chloroprene and the gasoline-soluble type of chlorinated paraffin.

The chlorinated paraffin used in the composition of this invention will have a chlorine content which is less than 52 per cent to insure gasoline solubility, and which is more than about 10 per cent. Preferably, the chlorine content will be between about 25 per cent and about 45 per cent. The chlorinated paraffin wax will, desirably, be stabilized by treatment using an aqueous alkali solution as more completely described in the copending application for United States Letters Patent of William T. Bishop, Serial No. 15,505 filed April 9, 1935 now U. S. Patent 2,119,149, and/or stabilized by the addition of organic base.

The polymerized chloroprene used in the composition in accordance with my invention is the unvulcanized chloroprene polymer having physical properties similar to those of natural rubber. Such polymerized chloroprene is described by U. S. Patent 1,967,863 and the applications therein mentioned, and chemically is a polymer of chloro-2-butadiene-1-3 or of a related halogen substituted diene.

In addition to chlorinated paraffin and polymerized chloroprene, the compositions in accordance with my invention may include vulcanizing agents, for example, metallic oxides, as, magnesium oxide, zinc oxide, lead oxide, abietic acid containing compounds, as, wood rosin, pine tar, etc., vulcanization accelerators, sulfur, etc.; they may contain rubber anti-oxidants, such as a phenyl-naphthylamine, for example, phenyl-alpha-naphthylamine (Neozone A), phenyl-beta-naphthylamine (Neozone D), etc.; they may contain reinforcing pigments, as, carbon blacks, clay, blanc fixe, etc.; they may contain fillers and/or diluents, such as, whiting, barytes, asbestine, factice, rubber, various synthetic plastics, rubber-like materials, glue, etc.; they may contain softeners, such as, paraffin wax, fatty acids, oils, terpenes, tars, cumar resins, etc.; and they may contain deodorants, such as, terpene compounds, etc.

The composition in accordance with my invention may contain chlorinated paraffin wax in amount within the range of about 1% to somewhat more than about 100% by weight based on the amount of polymerized chloroprene present, and will preferably contain chlorinated paraffin wax in amount within the range of about 30% to about 100% by weight of the polymerized chloroprene present.

The chlorinated paraffin wax-polymerized chloroprene composition may be vulcanized by heat alone with no additional ingredients present. It will be found, however, that vulcanization of this composition will be aided by compounding it with other ingredients. Thus, for example, wood rosin, abietic acid, pine tar, sulfur, metallic oxides, etc. may be compounded into the composition before vulcanization. The wood rosin or abietic acid may be added in amounts up to about 5% of the weight of the polymerized chloroprene present, and the pine tar may be added in amounts up to about 10%. When using pine tar in amounts above 5% by weight of the chloroprene present, it is usually necessary to reduce the amount of softener contained in the composition, as the pine tar has a softening action on the composition.

Sulfur may be added in amounts up to about 3% by weight of the polymerized chloroprene present. When added in excessive amounts the sulfur tends to "bloom" out of the composition. The exact amount that may be added depends on the various ingredients present in the composition. The metallic oxide added to the composition may be, for example, magnesia, zinc oxide, lead oxide, or combinations of these materials. Such oxides are valuable additions to the composition in that they improve the physical properties of the composition and, in addition, act as acceptors for any hydrochloric acid which may be evolved from either the chlorinated paraffin wax or the polymerized chloroprene. Metallic oxides may be added to the composition in amounts up to about 10% based on the total weight of chlorinated paraffin and polymerized chloroprene present.

An organic vulcanization accelerator may, if desired, be added to the composition. Such addition is not essential. The resistance of the composition to aging is improved by the addition of anti-oxidants, such as, for example, phenyl-alpha-naphthylamine and phenyl-beta-naphthylamine in amounts within the range of about 1% to about 5% by weight of the polymerized chloroprene in the composition. Carbon blacks, such as, for example, channel carbon black or "soft blacks" may be advantageously added to the composition. Such carbon blacks may be added in amounts up to 100–200% by weight of the total weight of chlorinated paraffin wax and polymerized chloroprene, depending upon the exact carbon black used. Glue may be added in amounts up to about 25% by weight.

Various softeners, such as, for example, paraffin wax, fatty acids, terpenes, oils, tars, waxes, cumarone resins, etc., may, if desired, be added to the composition. Such additions are usually not desirable, since they tend to decrease the resistance of the composition to gasoline and oils. Chlorinated paraffin wax acts as a softener for the composition, and any desired softening may be obtained by increasing the percentage of chlorinated paraffin contained in the composition, and depending upon the degree of chlorination and the amount of the chlorinated paraffin wax used, the solvent resistance may be materially improved.

Equivalently, I may utilize polymerized chloroprene which has been treated to introduce combined sulfur into the molecule. Thus, I may utilize polymerized chloroprene, which has been treated with hydrogen sulfide, ammonium sulfide, and the like. The use of polymerized chloroprene which has been treated with hydrogen sulfide or other sulfide or hydrosulfide has the advantage that excellent properties develop upon vulcanization even when rosin, pine tar, and the like, which have a tendency to detract from gasoline resistance, are omitted altogether.

In the vulcanization of the compositions in accordance with this invention, it will be found that the time and temperature are interrelated, and that the exact time and temperature utilized is dependent upon the exact composition of the mixture, the accelerator or catalyst utilized, and the extent of cure desired. Thus, the temperature of vulcanization may be in the range between about 160° F. and about 350° F. and the time between about 5 minutes and about 6 hours. In general, a low temperature is used with a long period of vulcanization and a high temperature with a short period. Ordinarily, however, it will be found that a temperature within the range of about 240° F. to about 320° F. and a period of time within the range of about 10 to about 90 minutes is preferred.

The compositions in accordance with my invention and the characteristics thereof are more specifically illustrated by the following examples, in which they were compared with prior compositions not containing chlorinated paraffin wax.

EXAMPLE I

Two mixtures of the composition given in Table I were compounded and thoroughly admixed.

Table I

|  | Prior art composition | Example I |
|---|---|---|
|  | Pts. by wt. | Pts. by wt. |
| Polymerized chloroprene | 150 | 150 |
| Chlorinated paraffin wax (50% chlorine) |  | 75 |
| Sulfur | 1.25 | 1.25 |
| Magnesia | 15 | 15 |
| Phenyl-alpha-naphthylamine | 1.25 | 1.25 |
| Stearic acid | 2.5 | 2.5 |
| Cumarone resin (Cumar P-25) | 10 | 10 |
| Whiting | 150 | 150 |
| Carbon black (Black P33) | 125 | 125 |
| Zinc oxide | 15 | 15 |
| FF wood rosin | 10 | 10 |
| Pine tar | 10 | 10 |

These two mixtures were cured at a temperature of 288° F. for a period of 50 minutes, and then measured for physical characteristics with the results shown in Table II.

Table II

|  | Prior art mixture | Example I |
|---|---|---|
| Tensile strength lbs./sq. in. | 1,073 | 909 |
| Elongation per cent | 425 | 321 |
| Permanent set do | 25.0 | 21.4 |
| Volume increase after 672 hours immersion in 68–70° gasoline (Atlantic) at room temperature per cent | 31.9 | 3.6 |

In the above table it will be noted that the compositions in accordance with this invention showed a volume increase of only 3.6% on the immersion in gasoline while the corresponding prior art example showed a volume increase of 31.9%.

EXAMPLES II AND III

A polymerized chloroprene stock mixture having the following composition was prepared.

Table III

Polymerized chloroprene stock mixture (parts by weight)

| Polymerized chloroprene | 150 |
| Sulfur | 1.25 |
| Magnesia | 15 |
| Phenyl-alpha-naphthylamine (Neozone D) | 1.25 |
| Stearic acid | 2.5 |
| Cumarone resin (Cumar P-25) | 10 |
| Whiting | 150 |
| Carbon black (Black P33) | 125 |
| Zinc oxide | 15 |
| FF wood rosin | 10 |
| Pine tar | 10 |

The above mixture was formulated into two compositions in accordance with this invention as follows:

*Table IV*

|  | Ex. II | Ex. III | Comparator |
|---|---|---|---|
| Polymerized chloroprene stock mixture (Table III)____grams__ | 400 | 400 | 400 |
| Chlorinated paraffin 34.2% Cl$_2$ grams__ | 60 |  |  |
| Chlorinated paraffin 48% Cl$_2$ grams__ |  | 60 |  |
| Carbon black (P-33)_____do____ | 56 | 56 |  |
| These stocks were cured at 288° F. for 60 minutes. |  |  |  |
| Hardness_____ | 71 | 75 | 81 |
| Tensile_____ | 981 | 1,046 | 943 |
| Elongation_____percent__ | 375 | 333 | 421 |
| Permanent set_____do____ | 18.8 | 17.2 | 14.1 |
| Immersion test in gasoline (68-70° Atlantic) at room temperature |  |  |  |
| Vol. increase 48 hours___percent__ | 1.2 | 5.4 | 20.2 |
| Vol. increase 166 hours_____do___ | 0.77 | 3.4 | 21.8 |
| Vol. increase 336 hours_____do___ | 0.99 | 3.4 | 22.0 |

The data of Table IV show that the chlorinated paraffin wax of comparatively low chlorine contents has beneficial effects on the physical properties of the vulcanized composition, and very materially reduces the increase in volume on immersion in gasoline. These data show that, in some respects, compositions containing chlorinated paraffin waxes of lower chlorine contents are better than the compositions containing chlorinated paraffin waxes of higher chlorine contents. This effect is believed due to the more complete reaction obtained with the chlorinated paraffin of lower chlorine content.

The products according to this invention are characterized by resilience, high strength, and elongation with low permanent set; yet they are also characterized by being highly resistant to gasoline, petroleum naphthas, mineral oil, etc. In some cases they are from a practical viewpoint unaffected by petroleum compounds.

This application is a continuation-in-part of my application Serial No. 171,805, filed October 29, 1937, which is in turn a continuation-in-part of my application Serial No. 61,759, filed January 31, 1936, now U. S. Patent 2,138,192.

It will be understood that the details and examples hereinbefore set forth are illustrative only and that the invention as broadly described and claimed is in no way limited thereby.

What I claim and desire to protect by Letters Patent is:

1. A resilient synthetic rubber composition, resistant to swelling by gasoline and mineral oil, resulting from vulcanizing a mixture comprising polymerized chloroprene and a gasoline-soluble chlorinated paraffin wax.

2. A resilient synthetic rubber composition, resistant to swelling by gasoline and mineral oil, resulting from vulcanizing a mixture comprising polymerized chloroprene and a gasoline-soluble chlorinated paraffin wax, the chlorinated paraffin wax having a chlorine content above about 10% and less than 52% by weight.

3. A resilient synthetic rubber composition, resistant to swelling by gasoline and mineral oil, resulting from vulcanizing a mixture comprising polymerized chloroprene, a vulcanizing agent therefor, a metal oxide, an anti-oxidant, and a gasoline-soluble chlorinated paraffin wax, the chlorinated paraffin wax having a chlorine content above about 10% and less than 52% by weight.

4. A resilient synthetic rubber composition, resistant to swelling by gasoline and mineral oil, resulting from vulcanizing a mixture comprising polymerized chloroprene, magnesium oxide and a gasoline-soluble chlorinated paraffin wax, the chlorinated paraffin wax having a chlorine content above about 10% and less than 52% by weight.

5. A resilient synthetic rubber composition, resistant to swelling by gasoline and mineral oil, resulting from vulcanizing a mixture comprising polymerized chloroprene and a gasoline-soluble chlorinated paraffin wax, the chlorinated paraffin wax having a chlorine content between about 30% and about 45% by weight.

6. A resilient synthetic rubber composition, resistant to swelling by gasoline and mineral oil, resulting from vulcanizing a mixture comprising polymerized chloroprene and a gasoline-soluble chlorinated paraffin wax in an amount between about 30% and about 100% by weight of the polymerized chloroprene, the chlorinated paraffin wax having a chlorine content above about 10% and less than 52% by weight.

7. A resilient synthetic rubber composition, resistant to swelling by gasoline and mineral oil, resulting from vulcanizing a mixture comprising polymerized chloroprene and a gasoline-soluble chlorinated paraffin wax in an amount between about 30% and about 100% by weight of the polymerized chloroprene, the chlorinated paraffin wax having a chlorine content between about 30% and about 45% by weight.

8. A resilient synthetic rubber composition, resistant to swelling by gasoline and mineral oil, resulting from vulcanizing a mixture comprising polymerized chloroprene, a metal oxide, a reenforcing pigment and gasoline-soluble chlorinated paraffin wax in an amount between about 30% and about 100% of the polymerized chloroprene, the chlorinated paraffin wax having a chlorine content between about 30% and about 45% by weight.

EMIL OTT.